United States Patent [19]

Schäfer et al.

[11] Patent Number: 4,853,453

[45] Date of Patent: Aug. 1, 1989

[54] MODIFIED SILICONE RUBBER AND ITS USE AS A MATERIAL FOR OPTICAL LENSES AND OPTICAL LENSES MADE FROM THIS MATERIAL

[75] Inventors: Horst Schäfer, Aschaffenburg; Gerhard Kossmehl, Berlin; Walter Neumann, Königsbronn, all of Fed. Rep. of Germany

[73] Assignee: Ciba-Geigy Corporation, Ardsley, N.Y.

[21] Appl. No.: 135,512

[22] Filed: Dec. 18, 1987

Related U.S. Application Data

[63] Continuation of Ser. No. 863,136, May 14, 1986, abandoned.

[30] Foreign Application Priority Data

May 15, 1985 [DE] Fed. Rep. of Germany ........ 3517612

[51] Int. Cl.[4] ................................................ C08B 77/06
[52] U.S. Cl. ........................................ 528/28; 525/474; 351/160 H; 351/159
[58] Field of Search .......................... 528/28; 525/474; 351/160 H, 159

[56] References Cited

U.S. PATENT DOCUMENTS

| | | | |
|---|---|---|---|
| 3,179,622 | 4/1965 | Haluska | 528/28 |
| 3,502,704 | 3/1970 | McKellard | 528/28 |
| 3,585,065 | 6/1971 | Johnson | 525/474 |
| 4,136,250 | 1/1979 | Mueller et al. | |
| 4,261,875 | 4/1981 | LeBouef | |
| 4,457,887 | 7/1984 | Porsche | 528/28 |
| 4,486,577 | 12/1984 | Mueller et al. | |
| 4,518,758 | 5/1985 | Cavezzan et al. | 528/28 |
| 4,528,344 | 9/1985 | Kira | |
| 4,543,398 | 9/1985 | Bany et al. | 351/160 H |
| 4,605,712 | 8/1986 | Muellar et al. | 351/160 H |

FOREIGN PATENT DOCUMENTS

| | | | |
|---|---|---|---|
| 711761 | 6/1965 | Canada | 528/28 |
| 895981 | 11/1953 | Fed. Rep. of Germany | |
| 1374574 | 12/1964 | France | |
| 156005 | 9/1982 | Japan | 528/28 |
| 195176 | 11/1982 | Japan | 528/28 |
| 238315 | 11/1985 | Japan | 525/474 |
| 975727 | 11/1982 | U.S.S.R. | 528/28 |
| 933683 | 8/1963 | United Kingdom | 525/475 |

OTHER PUBLICATIONS

M. L. Dunham et al., Ind. & Eng. Chem., 49, 1373 (1957).
Derwent 67658A/38.

*Primary Examiner*—John C. Bleutge
*Assistant Examiner*—David W. Woodward
*Attorney, Agent, or Firm*—Luther A. R. Hall

[57] ABSTRACT

A modified silicone rubber with dimethylsiloxane and urethane units in the main chains, which are cross linked through methyl groups. This material is hydrophilic and suitable as a contact lens material.

12 Claims, No Drawings

MODIFIED SILICONE RUBBER AND ITS USE AS A MATERIAL FOR OPTICAL LENSES AND OPTICAL LENSES MADE FROM THIS MATERIAL

This is a continuation of application Ser. No. 863,136, filed on May 14, 1986, now abandoned.

BACKGROUND OF THE INVENTION

Polysiloxanes, especially silicone rubber, find use in a wide range of technical and medical fields. Silicone rubber has a high oxygen permeability, for which reason the material would be expected to be suitable for the manufacture of contact lenses. However, silicone rubber is a hydrophobic material, and for this reason this material cannot yet, because of resulting problems, be used for this purpose although it has been suggested, since about 1960, to make the material suitable for contact lenses. At the present time two differing methods have been tried in order to make silicone rubber usable for this purpose. One method consists of rendering the silicone rubber surface hydrophilic (European Pat. No. 0,033,754, U.S. Pat. No. 4,143,949, French Pat. No. 2,407,232, German Auslegesschrift Nos. 2,353,495 and 2,164,805). Another known method (U.S. Pat. No. 3,925,138) consists in putting polar groups into the polymer chain.

It is an object of this invention to provide a modified silicone rubber which is hydrophilic, and to provide a process for its synthesis.

SUMMARY OF THE INVENTION

This objective is accomplished by the characteristic features of this invention, namely an optical lens, especially a contact lens or an intraocular lens characterized by being made of the hydrophilic modified silicone rubber. The silicone rubber is modified with dimethylsilane and methane units in the principal chains, which are cross-linked through methyl groups.

DETAILED DISCLOSURE

The silicone rubber material provided by the invention is hydrophilic and resistant to hydrolysis. The clear material also has small contact angles, so that it is sufficiently wettable.

The starting materials for the synthesis of the given copolymer are low molecular weight, hydroxyalkyl-group-containing siloxanes, which are reacted with isocyanates. The oily reaction product, so obtained, is cross-linked with the help of a suitable initiator, particularly through reaction with 1-10 weight percent of peroxide initiator.

Hydroxyalkyl-group-containing siloxanes, suitable as starting materials, are, for example, the following:

(1) 1,3-bis(3-hydroxypropyl)-1,1,3,3,-tetramethyl-disiloxane;
(2) 1-(3-hydroxypropyl)-1,1,3,3-tetramethyldisiloxane;
(3) 1,3-bis(6,7-dihydroxy-4-oxaheptyl)-1,1,3,3-tetramethyl-disiloxane;
(4) 3,5-bis(3-hydroxypropyl)-1,1,1,3,5,7,7,7-octamethyl-tetrasiloxane;
(5) 1-(6,7-dihydroxy-4-oxaheptyl)-1,1,3,3-tetramethyl-disiloxane;
(6) 2,4,6,8-tetrakis(3-hydroxypropyl)-2,4,6,8-tetramethylcyclotetrasiloxane;
(7) methylene-bis-1,4-cyclohexylene(carbamic acid)-3-[3-hydroxypropyl)-1,1,3,3-tetramethyldisiloxanyl]-propyl ester;
(8) hexamethylene-1,6-(biscarbamic acid)-3-[3-(3-hydroxypropyl)-1,1,3,3-tetramethyldisiloxanyl]-propyl ester The above compounds (1), (2), (3), (4) and (5) can be synthesized by way of the corresponding trimethylsilyl-protected compounds (1'), (2') and (4') or over the oxirane derivatives (3') and (5'), which are obtained by the addition of allyloxytrimethylsilane or allyl-(2,3-epoxypropyl)ether to dihydrosiloxanes, the respective trimethyl group being split off or the oxiranes being opened up.

The corresponding reactions proceed according to the following schemes:

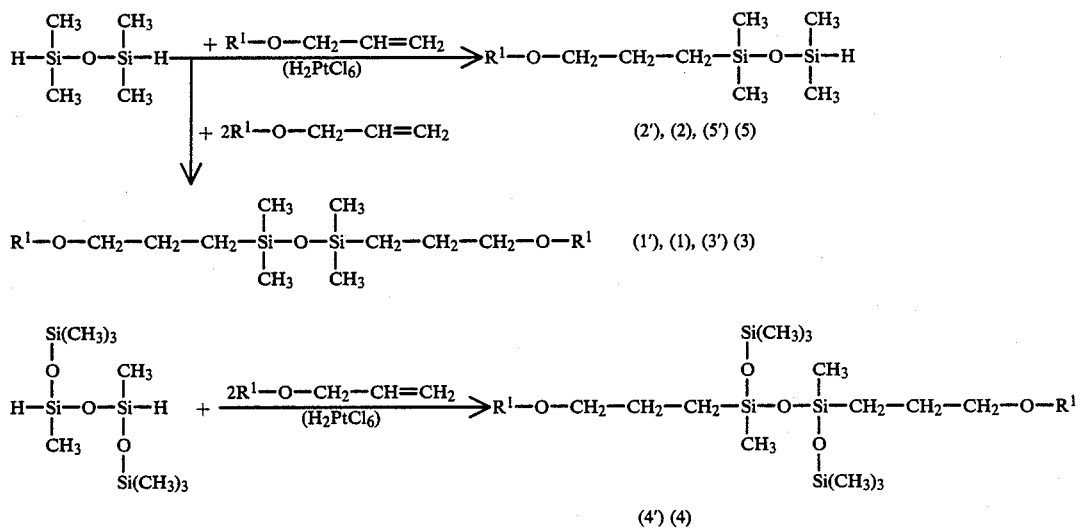

| Compound | (1') (2') (4') | (1) (2) (4) | (3') (5') | (3) (5) |
|---|---|---|---|---|
| —R[1] | —Si(CH$_3$)$_3$ | —H | —CH$_2$—CH——CH$_2$ \\ / O | —CH$_2$—CH—(OH)—CH$_2$OH |

EXAMPLES 1 AND 2

The two compounds (1) and (2), named above, are formed by the addition of allyloxytrimethylsilane to 1,1,3,3-tetramethyldisiloxane in the presence of H$_2$PtCl$_6$ as catalyst (S. Kohama and S. Fukukawa, *Nippon Kagaku Zasshi* 81, 170 (1960); *Chem Abstr.* 56, 496e,f (1962); G. Greber and S. Jäger, *Makromol. Chem.* 57, 150 (1962). The subsequent hydrolysis of the two reaction products leads to the above-named compounds (1) and (2).

EXAMPLE 3

The above-named compound (3) is synthesized as follows. Allyl glycidyl ether (114.0 g, 1 mole) is heated to 100° C. and 2 mL of a 1 weight percent solution of hexachloroplatinic acid in ethylene glycol diethyl ether are added. 1,1,3,3-Tetramethyldisiloxane (67.0 g, 0.5 moles) is slowly added dropwise, the temperature being prevented from exceeding 135° C. After the addition of the 1,1,3,3,tetramethyldisiloxane, the mixture is stirred at 120° C. until it no longer refluxes. The reaction mixture is fractionated with the help of a packed column. The 1,3-bis(6,7-epoxy-4-oxaheptyl)-1,1,3,3-tetramethyldisiloxane formed boils as a clear liquid at 174° C. and 1.4 hPa.

Yield: 104.3 g (57.6%) n$_d^{20}$: 1.4511.

$^1$H-NMR (CDCl$_3$, 270 MHz): δ=0.02 (s; Si—CH$_3$, 12H, 0.46 (m; Si—CH$_2$—, 4H), 1.54 (m; —CH$_2$—CH$_2$—CH$_2$—, 4H), 2.55

(q; —CH—CH$_2$—O, 2H), 2.73 (t, —CH—CH$_2$—O, 2H), 3.09 (m; —CH$_2$—CH$_2$, 2H), 3.33 (m; —CH$_2$—O—CH$_2$—CH—, 2H), 3.40 (m; —CH$_2$—CH$_2$—O—, 4H), 3.65 (q; —CH$_2$—O—CH$_2$—CH—, 2H).

C$_{16}$H$_{34}$O$_7$Si$_2$ (362.6) calculated: C 53.00, H 9.45, found: C 53.27, H 9.48.

The epoxy compound mentioned above (36.3 g, 0.1 mole) is dissolved in 100 mL of chloroform. A 5 weight percent solution (50 mL) of sulfuric acid is added. After stirring under reflux for one hour, the organic phase is separated off. The aqueous phase is extracted with 50 mL of chloroform. The combined organic phases are washed with water and dried with sodium sulfate. The chloroform is drawn off and the residue is stirred for 8 hours at 40° C. and 0.3 hPa. The compound (3) is obtained here as a clear, viscous liquid.

Yield: 33.6 g (84.3%), n$_D^{20}$=1.4462.

$^1$H—NMR (CDCl$_3$, 270 MHz): δ=0.02 (s; Si—CH$_3$, 12H), 0.45 (m; Si—CH$_2$, 4H), 1.55 (m; —CH$_2$—CH$_2$—CH$_2$—, 4H), 3.38 (m; —CH$_2$—CH$_2$—O—, 4H), 3.41 (m; —O—CH$_2$—CH—, 4H), 3.57 (m; —CH$_2$—OH, 4H), 3.83 (m; —CH—OH, 2H), 4.69 (m(b): —CH—OH, —CH$_2$—OH, 4H).

C$_{16}$H$_{38}$O$_7$Si$_2$ (398.7) calculated: C 48.21, H 9.61, found: C 47.57, H 9.37.

EXAMPLE 4

In the following, an example is described for obtaining compound (4). Allyloxytrimethylsilane (13.0 g, 100 mmoles) is added to a round-bottom flask and heated to reflux. After the addition of 1 mL of a 1 weight percent solution of hexachloroplatinic acid in diethylene glycol ether, 14. g (50 mmoles) of 1,1,1,3,5,7,7,7-octamethyltetrasiloxane are added dropwise with vigorous stirring. The solution is then stirred for 24 hours at 100° C. and fractionated. The reaction product is distilled through a packed column. 3,5-Bis(3-trimethyl-silyoxypropyl)-1,1,1,3,5,7,7,7-octamethyltetrasiloxane is obtained. This compound has a boiling point of 141° to 143° C. at 0.5 hPa.

After the addition of 30 mL of ether, 7.0 g (13 mmoles) of this alkylpolysiloxane are hydrolyzed for 12 hours with 5 mL of a 5 weight percent solution of HCl at room temperature. The organic phase is separated off and washed with a sodium bicarbonate solution and then with water until it is neutral. After drying with sodium sulfate, the ether is evaporated and the residue is stirred for 10 hours at 30° to 40° C. and a pressure of 0.15 hPa. Compound (4) is obtained here as a clear, viscous liquid.

Yield: 5.53 g (13.9%), n$_D^{20}$: 1.4347

$^1$-NMR (CCl$_4$, 100 Hz): δ=0.13 (s; Si—CH$_3$, 24H), 0.55 (m; Si—CH$_2$—, 4H), 1.56 (m; —CH$_2$—CH$_2$—CH$_2$—, 4H), 3.50 (t; —CH$_2$—O—, 4H), 4.14 (s; —OH, 2H).

C$_{14}$H$_{38}$O$_5$Si$_4$ (398.8) calculated: C 42.16, H 9.60, found: C 41.12, H 9.80.

EXAMPLE 5

An example of the synthesis of compound (5) is described in the following. 1,1,3,3-Tetramethyldisiloxane (17.5 g, 130 mmoles) is heated to the refluxing temperature and 1 mL of a 1 weight percent solution of hexachloroplatinic acid in diethylene glycol diethyl ether is added. Allyl glycidyl ether (11.4 g (100 mmoles) is added dropwise. At the same time, the temperature rises to 95° C. The reaction mixture is stirred for 2 hours at 120° C. and then fractionated with the help of a packed column. At 73° C. and 0.65 hPa, 1-(6,7-epoxy-4-oxaheptyl)-1,1,3,3-tetramethyldisiloxane (monoaddition compound) is obtained as a clear liquid.

Yield: 13.0 g (52.3%), n$_D^{20}$: 1.4293

$^1$H NMR (CDCl$_3$, 270 MHz): δ=0.02 (s; Si—CH$_3$, 6H), 0.11 (s; SiH—CH$_3$, 6H), 0.47 (m; Si—CH$_2$—, 2H), 1.57 (m; —CH$_2$—CH$_2$—CH$_2$—, 2H), 2.55 (q; —CH—CH$_2$—O, 1H), 2.73 (t; —CH—CH$_2$O, 1H), 3.09 (m; —CH$_2$—CH—, 1H), 3.33 (m; —CH$_2$—O—CH$_2$—CH—, 1H), 3.41 (m; —CH$_2$—CH$_2$—O—, 2H), 3.65 (q; —CH$_2$—O—CH$_2$—CH—, 1H).

C$_{10}$H$_{24}$O$_3$Si$_2$ (248.5) calculated: C 48.33, H 9.74, found: C 48.00, H 9.52.

The compound obtained above (10 g, 40 mmoles) is dissolved in 100 mL of ether and mixed with 50 mL of a 5 weight percent solution of HCl. After stirring vigorously for four hours, the organic phase is separated off. The aqueous phase is extracted with 50 mL of ether.

The combined organic phases are washed with water and dried with sodium sulfate. The ether is evaporated and the residue is distilled in a bulb tube still. Compound (5) has a boiling point of 140° C. at 0.35 hPa and is a clear liquid.

Yield: 7.1 g (66.6%), $n_D^{20}$: 1.4425.

$^1$H—NMR (CDCl$_3$, 270 MHz): δ=0.02 (s; Si—CH$_3$, 6H), 0.10 (d; SiH—CH$_3$), 6H), 0.47 (m; Si—CH$_2$—, 2H), 1.57 (m; —CH$_2$—CH$_2$—CH$_2$—, 2H), 2.95 (d; —CH—OH, 1H), 3.44 (t; —CH$_2$—CH$_2$—O—, 2H0, 3.48 (d, —O—CH$_2$—CH—, 2H), 3.55 (m; —CH$_2$—OH, 2H), 3.55 (b, —CH$_2$—OH, 1H), 3.93 (m; —CH—OH, 1H), 4.63 (m; Si—H, 1H).

$C_{10}H_{26}O_4Si_2$ (266.5) calculated: C 45.07, H 9.83, found: C 44.18, H 9.81.

EXAMPLE 6

Compound (6) can be synthesized as follows. 2,4,6,8-Tetramethylcyclotetrasiloxane (24.0 g, 100 mmoles) (R. O. Sauer, W. J. Schreiber, S. D. Brewer, *J. Am. Chem. Soc.* 68, 962, 1946) and 2 mL of a 1 weight percent solution of hexachloroplatinic acid in ethylene glycol diethyl ether are added to a round-bottom flask and heated to 95° C. Allyloxytrimethylsilane (52.1 g, 400 mmoles) (S. Kohama, S. Fukukawa *Nippon Kagaku Zasshi* 81, 170, 1960) is added dropwise with stirring, the temperature increasing to 106° C. The mixture is heated to 110° C. and stirred until refluxing stops. After cooling to room temperature, 200 mL of ether and 100 mL of 0.2N HCl are added and the mixture is hydrolyzed for 12 hours. The organic phase is separated off and washed three times, in each case with 150 mL of distilled water, and then dried over sodium sulfate. The solvent is evaporated off and the residue is stirred slowly for 24 hours at 40° C. and 0.3 hPa. In the last hour, the temperature of the residue is raised to 80° to 90° C. After filtration through a G4 fritted glass filter, compound (6) is obtained as a clear liquid.

Yield: 18.8 g (39.8%); $n_D^{20}$: 1.4450; (IR (film): 3,350 (m; OH), 1,085; (vs; Si—O—Si) and 880 cm$^{-1}$ (vs, Si—CH$_3$).

MS: m/e 472 (M$^+$) (1); 222 (M—CH$_3$, —2(CH$_2$)$_3$—OH, O—Si(CH$_3$)—CH$_2$—CH$_2$—OH)$^+$ (81); 207 (M—2CH$_3$, —2(CH$_2$)$_3$—OH, —O—Si(CH$_3$)—CH$_2$—CH$_2$CH$_2$—OH)$^+$ (100)$^3$.

$^1$H NMR (CDCl$_3$); =0.08 (s; Si—CH$_3$, 12H), 0.49 (m; Si—CH$_2$—, 8H), 1.56 (m; —CH$_2$—CH$_2$—CH$_2$—, 8H), 2.60 (s(b); —OH, 4H), 3.50 (m; —CH$_2$—OH, 8H).

$C_{16}H_{40}O_8Si_4$ (472.9) calculated: C 40.64, H 8.53, found: C 41.13, H 8.65.

EXAMPLE 7

Compound (7) can be obtained as follows. The addition reaction of 1-(3-trimethylsilyloxypropyl)-1,1,3,3-tetramethyldisiloxane (G. Greber, S. Jäger, *Makrom. Chem.* 57, 150 (1962) with the bifunctional allylcarbamate methylenebis(1,4-cyclohexaneallylcarbamate) in the presence of hexachloroplatinic acid as catalyst, followed by hydrolysis, leads to the diol (7).

This compound contains two urethane and two disiloxane units, as well as two hydroxy groups as terminal groups.

The reaction proceeds as follows:

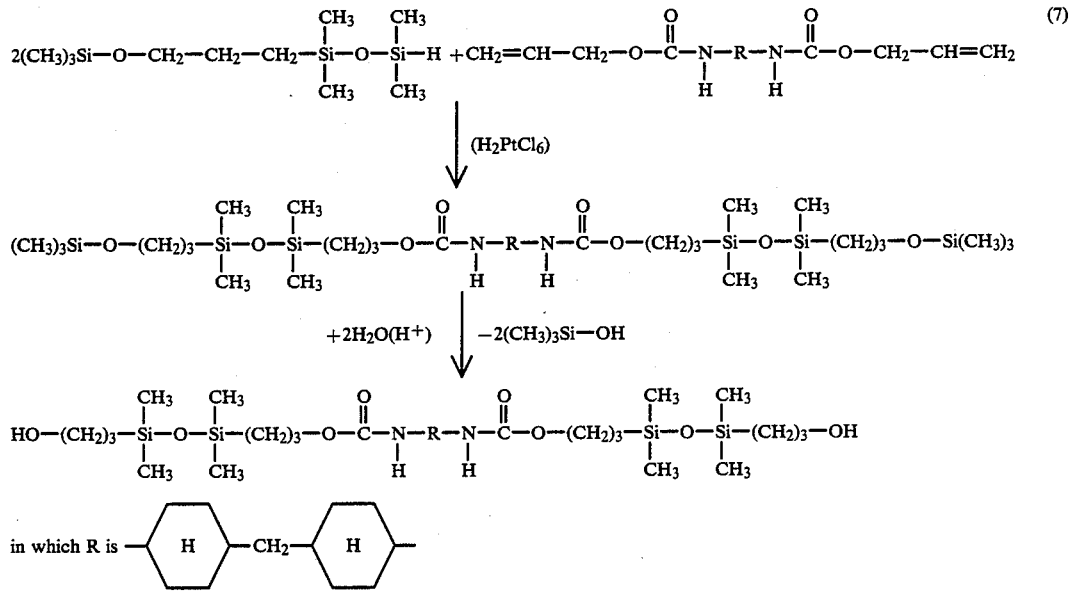

Compound (7) can be synthesized as follows. Allyl alcohol (11.6 g, 0.2 moles) is added to a round-bottom flask and heated to the refluxing temperature. On addition of 26.0 g (0.1 moles) of methylene-bis(1,4-cyclohexyleneisocyanate), the temperature increases to 110° C. After 30 minutes, the mixture is cooled and the crude product is recrystallized from acetone/ether (1:1). In this manner, methylene-bis(1,4-cyclohexyleneallylcarbamate) is obtained as a white powder.

Yield: 29.1 g (77.0%); melting point: 100°–101° C.

IR(KBr): 3310 (m; NH), 1690 (s; A mid I), 1645 (m; >C=C<), and 1540 cm$^{-1}$ (s; A mid II).

MS: m/e 378 (M$^+$) (65); 293 (M—CO—O—CH$_2$—CH=CH$_2$)$^+$ (87); 196 (M—CO—O—CH$_2$—CH=CH$_2$, —C$_6$H$_{10}$—NH)$^+$ (80); 41 (CH$_2$—CH=CH$_2$)$^+$ (100).

¹H NMR (CDCl₃):

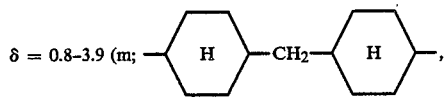

δ = 0.8-3.9 (m;

22H), 4.50 (d; —CH₂—O—, 4H), 4.84 (s(b); NH, 2H), 5.20 (m; H₂C=CH—, 2H), 5.30 (m; H₂C—CH—, 2H), 5.92 (m; H₂C=CH—, 2H).

C₂₁H₃₄N₂O₄ (378.5) calculated: C 66.64, N 7.40, H 9.05, found: C 66.99, N 7.57, H 9.13.

The powdery reaction product (3.8 g, 10 mmoles) so obtained is dissolved in absolute xylene and heated to the refluxing temperature. After the addition of 1 mL of 1 weight percent of hexachloroplatinic acid in diethylene glycol diethyl ether as catalyst, 5.3 g (20 mmoles) of 1-(3-trimethylsilyloxypropyl)-1,1,3,3-tetramethyldisiloxane is dissolved in 10 mL of absolute xylene and added dropwise with stirring. After refluxing for 4 hours, the mixture is cooled, 50 mL of a 5 weight percent solution of HCl are added and the mixture is stirred for 24 hours. The organic layer is separated off and dried with sodium sulfate. The by-products (hexamethyldisiloxane, trimethylsilanol) and xylene are largely distilled off. The by-products are removed completely at 50° C. and 0.1 hPa. Compound (7) is obtained as a brownish, viscous liquid.

Yield: 6.6 g (86.9%); N_D²⁰: 1.4637.

IR(film): 3340 (m; NH, OH), 1710 (s; Amid I), 1540 (s; Amid II) and 1080 cm⁻¹ (vs; Si—O—Si).

¹h NMR (CDCl₃): =0.08 (m; Si—CH₃, 24H), 0.46 (m; Si—CH₂—, 8H), 1.14-3.45 (m;

—CH₂—CH₂—CH₂, —OH, 32H, 3.49 (m; —CH₂—OH, 4H), 3.96 (t; —CH₂—O—CO—, 4H), 4.52 (s(b); >NH, 2H).

C₃₅H₇₄N₂O₈Si₄ (763.3) calculated: C 55.07, N 3.67, H 9.77, found: C 53.46, N 3.29, H 9.62.

EXAMPLE 8

Compound (8) can be synthesized as follows. The addition reaction of:
1-(3-trimethylsilyloxypropyl)-1,1,3,3-tetramethyldisiloxane with hexamethylene-bis-1,6-allylcarbamate (V. G. Sinyavskii, A. L. Kravchenko, V. T. Burmistrov, L. N. Korsakova, Zh. Org. Khim. 5, 870 (1967)) in the presence of hexachloroplatinic acid as catalyst, followed by hydrolysis, leads to the diol (8).

This compound contains two urethane and two disiloxane units, as well as two hydroxy groups as terminal groups. The reaction proceeds according to the following outline:

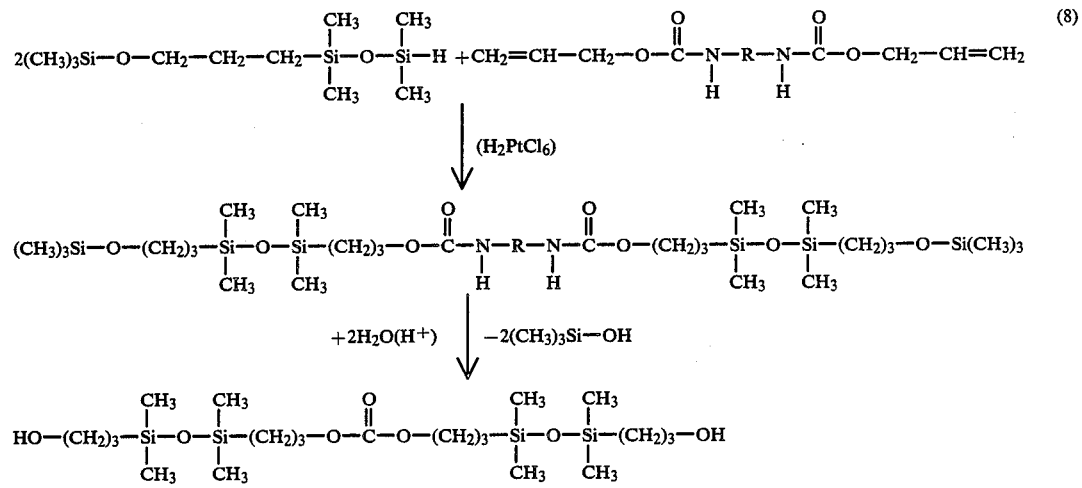

in which R is —(CH₂)₆—.

The diol can be synthesized as follows. First, allyl hexamethylenediallylcarbamate is synthesized by the addition of 16.8 g (0.1 moles) of hexamethylene diisocyanate to 11.6 g (0.2 moles) of absolute allyl alcohol, as described in detail for the synthesis of the preceding example. Yield: 19.3 g (68.0%); melting point: 71°-72° C. (yield claimed by V. G. Sinyavskii, A. L. Kravchenko, V. T. Burmistrov, L. N. Korsakova, Zh. Org. Khim. 5 870 (1967): 72.5%, melting point: 72.5°-73° C.).

This ester (2.84 g, 10 mmoles) is then added to 5.3 g (20 moles) of 1-(3-trimethylsilyloxypropyl)-1,1,3,3-tetramethyldisiloxane and the synthesis is carried out as in the preceding Example. The diol (8) is obtained as a brownish, viscous liquid.

Yield: 5.6 g (84.0%); n_D²⁰: 1.4501.

IR(Film): 3340 (m; NH, OH), 1705 (s; Amid I), 1540 (s; Amid II), and 1060 cm⁻¹ (vs; Si—O—Si).

¹H NMR (CDCl₃); δ=0.08 (m; Si—CH₃, 24H), 0.52 (m; Si—CH₂—, 8H), 1.32 (m; —CH₂—, 4H), 1.48 (m; —CH₂—, 4H), 1.58 (m; —CH₂—CH₂—CH₂—, 8H), 3.14 (m; —CH₂—NH—, 4H), 3.40 (t; —CH₂—OH, 4H), 3.99 (t; —CH₂—O—CO—, 4H), 4.94 (s(b), —NH, 2H)

C₂₈H₆₂N₂O₈Si₄ (667.2) calculated: C 50.41, N 4.20, H 9.37, found: C 49.87, N 4.08, H 9.17.

The diols labelled (1), (7) and (8) in the aforementioned compounds as well as the tetraols named (3) and (6) in the aforementioned compounds are reacted with diisocyanates and form copolymers with dimethylsiloxane and urethane units. The oily polymers obtained are cross linked over methyl groups of neighboring chains with the help of rubber-forming initiators, such as, for example, organic peroxides.

For the aforementioned compound (1), the course of the reaction is given for two examples, in which (10) hexamethylene diisocyanate or (11) methylene-bis(1,4-cyclohexylene isocyanate) is used as diisocyanate.

is formed. The material, synthesized from compounds (1), (9) and (10) is resistant to hydrolysis. The reaction proceeds as follows:

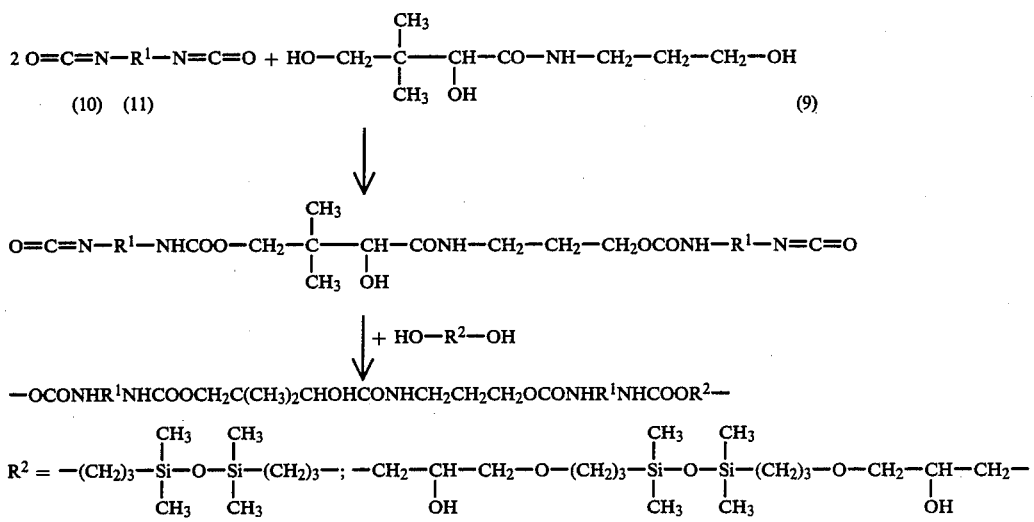

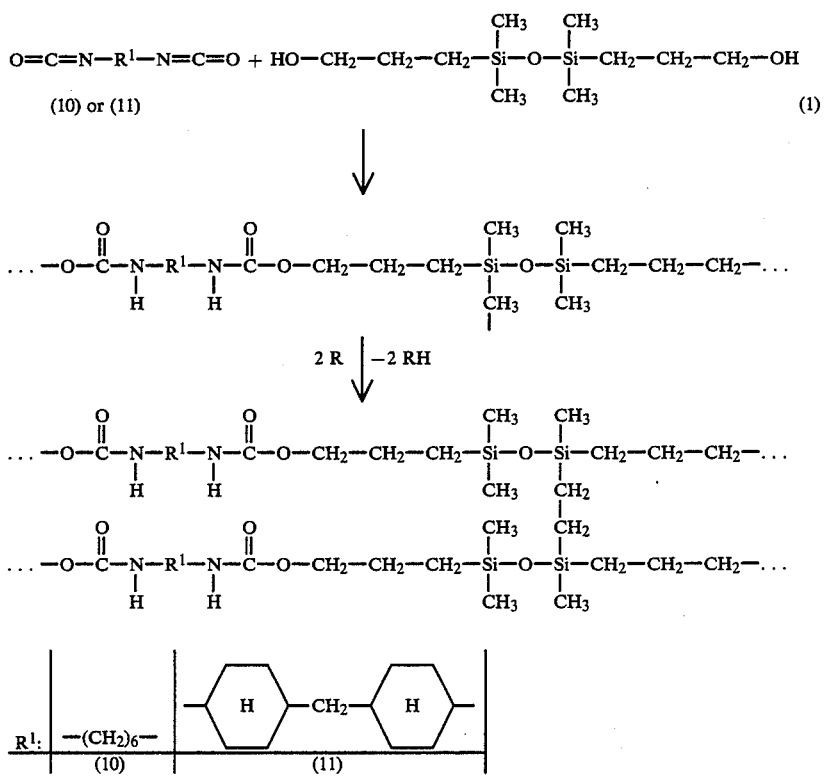

In order to increase the number of hydrophilic groups in the polymer, pantothenol (9) is incorporated into the polymer, which has siloxane and urethane units in the main chain. For this purpose, the pantothenol is reacted, for example, with hexamethylene diisocyanate (above compound (10) or methylene-bis(1,4-cyclohexylene isocyanate) (above compound (11) in the molecular ratio of 2:1. The reaction product can be reacted with the diol labelled (1) in the aforementioned compound or with the tetraol labelled (3) in the aforementioned compound and cross linked. In this case, a clear elastic film For the synthesis of the polymers listed in Table 1 in the form of the films F1 to F17, 10 mmoles of the aforementioned compounds (1), (3) and (6) are dissolved in 100 mL of absolute chloroform and heated to the refluxing temperature. The diisocyanate (10 mmoles) is dissolved in 20 mL of absolute chloroform and added dropwise with stirring. After two hours, the solution is evaporated to a volume of about 50 mL. Samples of 5 mL are mixed with an initiator, for example, di-tert.butyl peroxide or dicumyl peroxide. The viscous liquids obtained are poured onto glass plates and heated at an elevated temperature to form clear films (Table 1). In some cases, 1,3-divinyl-1,1,3,3-tetramethyldisiloxane (12) is added.

The aforementioned compounds (1) or (3) are mixed with polymethylhydrogensiloxane oil with terminal OH groups (13) or with polymethylhydrogensiloxane (14) (obtained from a hydrolysate of $Si(CH_3)Cl_2H$ with 10 mole percent of $Si(CH_3)_3Cl$ after the cyclic tetramer is distilled off). After the addition of 2 weight percent of hexachlorocyclotriphosphazene, based on the siloxane compounds (1) or (3), the mixture is equilibrated for 20 hours at 100° C. After removal of the catalyst and gelled particles by vacuum filtration, 100 mL of anhydrous chloroform are added and the procedure, already described above, is resumed, the polymer films given in Table 2 being obtained.

The following Tables 1 and 2 give the siloxane compounds, the temperatures, the preparation times and the initiators for the preparation of the polymer films F1 to F17.

at 80° C. and cooled. Compound (1) (12.5 g, 50 mmoles), which is dissolved in 200 mL of anhydrous dioxane and heated to 60° C, is then added rapidly. After stirring for 18 hours at 60° C., the solid material formed is filtered off. The cloudy filtrate is concentrated to a volume of about 80 mL. The residue is cross linked for one hour at 100° C. to the clear film F18.

During the reaction with 10.3 g (50 mmoles) of compound (9), 16.8 g (100 mmoles) of compound (10) and 20.0 g (50 mmoles) of compound (3), two separate phases (perforated film and creamy product) are formed.

The reaction product from 26.0 g (100 mmoles) of compound (11) and 10.3 g (50 mmoles) of compound (9) produces with the equivalent amount of 12.5 g (50 moles) of compound (1) or 20.0 g (50 mmoles) of compound (3) the clear films F20 and F21 respectively of sticky or brittle consistency.

TABLE 1

Preparation of Polymer Films from the Hydroxyalkyl-Group-Containing Siloxanes (1), (3) and (6) and Diisocyanates

| Film | Siloxane | Addition of (12) in wt % | Diisocyanate | Initiator di-t-BP in wt % | T/°C. | T/min | Comments |
|---|---|---|---|---|---|---|---|
| F1 | (3) | 0 | (10) | 2 | 100 | 70 | elastic film |
| F2 | " | 0 | (11) | 5 | 120 | 240 | yellow, brittle film |
| F4 | " | 10 | " | 2 | 120 | 135 | highly elastic film |
| F5 | " | 20 | " | 2 | 120 | 120 | highly elastic film |
| F6 | " | 30 | " | 2 | 120 | 160 | highly elastic film |
| F7 | (1) | 0 | (10) | 2 | 120 | 120 | brittle product |
| F15 | (6) | 0 | (11) | 5 | 120 | 240 | brittle film |
| F16 | " | 5 | " | 2 | 120 | 240 | yellow, brittle film |
| F17 | " | 10 | " | 2 | 120 | 240 | yellow, brittle film | di-t-BP = di-tert.butyl peroxide

TABLE 2

Preparation of Polymer Films from the Equilibrium Products of the Siloxanes (1) or (3) with the compounds (13) or (14) and Diisocyanates

| Film | Siloxane | Equilibration Product from | Amount in wt. % | Diisocyanate | Initiator | wt. % | T/°C. | t/min | Comments |
|---|---|---|---|---|---|---|---|---|---|
| F3 | (3) | (13) | 100 | (10) | di-t-BP | 5 | 120 | 180 | sticky film |
| F8 | (1) | (14) | 100 | " | di-CP | 1 | 120 | 90 | hard brittle film |
| F9 | " | " | 100 | (11) | " | 1 | 120 | 90 | hard film |
| F10 | " | " | 100 | " | " | 1 | 120 | 180 | yellow brittle film |
| F11 | " | " | 300 | " | di-t-BP | 1 | 120 | 180 | brittle film |
| F12 | " | " | 300 | " | di-CP | 1 | 120 | 150 | yellow brittle film |
| F13 | " | " | 300 | " | di-t-BP | 10 | 120 | 120 | hard film |
| F14 | " | " | 300 | " | di-CP | 10 | 120 | 120 | hard film | di-t-BP = di-tert.-butyl peroxide
di-CP = dicumyl peroxide

In the following Table 3, the polymer films F18 to F21, which contain pantothenol, are listed. These polymer films are obtained as follows:

Hexamethylene diisocyanate (16.8 g, 100 mmoles) (preceding compound (10)) is dissolved in 100 mL of anhydrous dioxane and heated to 80° C. Pantothenol (10.3 g, 50 mmoles) (preceding compound (9)) is dissolved in 100 mL of anhydrous dioxane and added dropwise with stirring. The mixture is stirred for 1 hour

TABLE 3

Preparation of Polymer Films from the Siloxanes (1) or (3) as Starting Material and Using Pantothenol

| Film | Siloxane | Diisocyanate | T/°C. | t/min | Comments |
|---|---|---|---|---|---|
| F18 | (1) | (10) | 100 | 60 | elastic film |
| F19 | (3) | " | 100 | 60 | inhomogeneous film |
| F20 | (1) | (11) | 100 | 90 | sticky product |
| F21 | (3) | " | 100 | 90 | cloudy brittle |

TABLE 3-continued

Preparation of Polymer Films
from the Siloxanes (1) or (3)
as Starting Material and Using Pantothenol

| Film | Siloxane | Diisocyanate | T/°C. | t/min | Comments film |
|------|----------|--------------|-------|-------|---------------|

IR and FMIR IR Spectra of the Polymers

After evaporation of the solvent, the IR spectra of the polymers from the reaction of compounds (10) or (11) with the hydroxyalkylsiloxanes (1), (3) or (6), which were obtained on their films, show the amide vibrations I and II at 1700 cm$^{-1}$ and 1520 cm$^{-1}$. The NH valence band was found at 3350 cm$^{-1}$. Characteristic vibrations for siloxane units (M. Sakiyama, *Bull. Chem. Soc. Japan* 31, 67 (1958)) with high intensities are present at 1250 cm$^{-1}$ (Si—CH$_3$ together with amide (III), at 1000–1100 cm$^{-1}$ (Si—O—Si) and at 800 cm$^{-1}$ (Si(CH$_3$)$_2$) (N. Wright, M. J. Hunter, *J. Am. Chem. Soc.* 69, 803 (1947)).

After the cross linking reaction over siloxane units of different polymer chains, clear elastic films (F1 to F17) are produced. The films can be characterized by their FMIR-IR spectra (N. J. Harrick, J. Phys. Chem. 64, 1110 (1960) and J. Fahrenfort, Spectrochim. Acta 17, 698 (1961). These films show approximately the same bands as the above viscous polymers. The intensities of the amide oscillations I and II and the NH valence oscillation at 3350 cm$^{-1}$ are of lesser intensity than those of the above-described polymers. As expected, the spectra of the films, which are produced by the addition of the compounds (13) or (14) (Table 2), show additional Si-H absorptions at 2160 cm$^{-1}$. The spectra of the films F6 and F9 show isocyanate absorptions of medium intensity at 2270 cm$^{-1}$. All the other films (F1–F5, F8 and F10–F17) do not have these characteristic bands of the isocyanate groups.

The Oxygen Permeability of the Films

The oxygen permeability was measured with an oxygen flow meter according to the Versate setup. The films F1–F18 have oxygen permeability values P of between $1.0 \times 10^{-11}$ and $52.0 \times 10^{-11}$ mL O$_2 \times$ cm$^2$/mL$\times$mm Hg$\times$s (see Table 4 below). The oxygen permeability of the material depends on the thickness and reaches an upper limit (F. J. Haberich, *Referatesammlung der* 12. *Aschaffenburger Kontaktlinsentagung vom* 22. *bis* 24. *März* 1979 (Collection of Papers of the 12th Aschaffenburg Contact Lens Meeting from Mar. 22 to Mar. 24, 1979), page 16). The transmissibility takes the thickness into consideration and its values range from $0.6 \times 10^{-9}$ to $8.4 \times 10^{-9}$ mL O$_2$/cm$^2 \times$mm Hg$\times$s. For the films, the oxygen flux has values between 0.3 and 4.7 μL/cm$^2 \times$h.

The Contact Angle of the Films

The contact angle is a measure of the wettability of the surfaces and is determined with the help of the bubble method (H. Brevit, W. Müller-Lierheim, *Referatesammlung der* 12. *Aschaffenburger Kontaklinsentagung vom* 22. *bis* 24. *März* 1979 (Collection of Papers of the 12th Aschaffenburg Contact Lens Meeting from Mar. 22 to Mar. 24, 1979), page 52. The contact angles of the synthesized films F1–F18 have values between 30° and 77° (see the following Table 4). Hydrophilic materials are characterized by contact angles up to a maximum of 66° (Ch. F. Kreiner, *Kontaktlinsenchemie* (Contact Lens Chemistry), Median-Verlag, Heidelberg, 1980, page 84).

The Water Content of the Films

The water content of the films (G. Kossmehl, N. Klaus, N. Schäfer, *Angew. Makromol. Chem.* 132/124, 241 (1984) is defined as water % = [weight (wet) − weight (dry)] × 100 / weight (wet)

The water content of the films F1–F6 is low (see Table 4 below). The materials of films F8–F17 have negligible water contents. Film F18 has a water content of 4.6 weight percent with linear swelling (G. Kossmehl, N. Klaus, H. Schäfer, *Angew. Makrolmol. Chem.* 132/124, 241 (1984)) of 1.1%.

TABLE 4

Oxygen Permeability, Contact Angle and Water Content of Films F1–F18

| FILM | Film Thickness in mm | Oxygen Permeability (a) P-10$^{11}$ | (b) T-10$^9$ | (c) J | Contact Angle in degrees | Water Content in Weight Percent |
|------|---------------------|-------------------------------------|--------------|-------|--------------------------|--------------------------------|
| F1   | 0.17 | 3.4  | 2.0 | 1.1 | 32 | 3.7 |
| F3   | 0.17 | 8.5  | 5.0 | 2.8 | 30 | 1.7 |
| F4   | 0.17 | 1.0  | 0.6 | 0.3 | 43 | 2.0 |
| F5   | 0.34 | 3.4  | 1.0 | 0.6 | 33 | 1.5 |
| F6   | 0.23 | 1.4  | 0.6 | 0.3 | 45 | 3.3 |
| F8   | 0.40 | 25.2 | 6.3 | 3.5 | 77 | — |
| F9   | 0.46 | 17.9 | 3.9 | 2.2 | 46 | — |
| F10  | 0.39 | 12.9 | 3.3 | 1.8 | 69 | — |
| F11  | 0.23 | 15.0 | 6.5 | 3.6 | 60 | — |
| F12  | 0.62 | 52.0 | 8.4 | 4.7 | 47 | — |
| F13  | 0.25 | 19.8 | 7.9 | 4.4 | 39 | — |
| F14  | 0.26 | 19.5 | 7.5 | 4.2 | 71 | — |
| F18  | 0.35 | 29.2 | 8.3 | 4.6 | 59 | 4.6 |

(a) P in mL O$_2 \times$ cm$^2$/mL $\times$ (mm Hg) $\times$ s
(b) T in mL O$_2$/cm$^2 \times$ (mm Hg) $\times$ s
(c) J in uL/cm$^2$ = h
Films F2, F7 and F15–F17 were not strong enough for measurement.

Suitability of the Materials Described for Contact Lenses

Taking into consideration the values for the oxygen permeability, the contact angle and the water content of the films produced, it turns out that Films F3, F9, F11, F12, F13 and F18 fulfill the requirements that contact lens materials must meet (CH. F. Kreiner, *Kontaktlinsenchemie* (Contact Lens Chemistry), Median-Verlag, Heidelberg, 1980, page 84). These films do not contain any water-soluble fractions and are toxicologically safe. Film F18, which was prepared from the above compmounds (1), (9) and (10), possesses extremely high mechanical stability and good oxygen permeability.

Films F8, F10 and F14 are suitable as contact lens materials after additional surface hydrophilization.

In the following, additional materials are described, which are obtained by addition reactions of mono- or diisocyanates with the above hydroxyalkyl compounds (1), (2), (3), (4) and (5).

For example, by reacting the diols (1) with isocyanates or diisocynates (W. Siefken, *Justus Liebigs Ann. Chem.* 592, 75 (1948)), the siloxanes with urethane units (15) to (17) and the linear copolymers (18) and (19), which contain siloxane and urethane units, are formed.

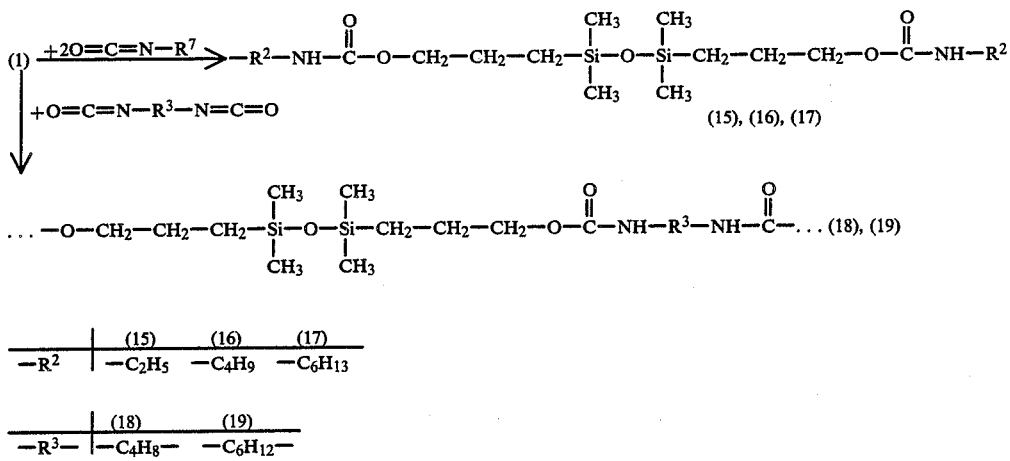

Examples of this are given in the following:

EXAMPLE 9

1,3-Bis(N-ethylcarbamoloxypropyl)tetramethyldisiloxane (15). Ethyl isocyanate (2.8 g, 40 mmoles) is added to 5.0 g (20 mmoles) of compound (1).

Yield: 6.7 g (86.0%), $n_d^{20}$: 1.4509.

$^1$H-NMR (CCl$_4$, 100 MHz): $\delta = 0.08$ (s; Si—CH$_3$, 12H), 0.50 (t; Si—CH$_2$—, 4H), 1.14 (t; C$\underline{H}_3$—CH$_2$—, 6H), 1.60 (m; —CH$_2$—C$\underline{H}_2$—CH$_2$—, 4H), 1.15 (m; —C$\underline{H}_2$—NH—, 4H), 3.94 (t; —CH$_2$—C$\underline{H}_2$—O—, 4H), 5.25 (m(b); >N—H, 2H)

C$_{16}$H$_{36}$N$_2$O$_5$Si$_2$ (392.6) calculated: C 48.95, N 7.13, H 9.24, found: C 48.74, N 7.11, H 9.15.

EXAMPLE 10

1,3-Bis(N-butylcarbamoyloxypropyl)tetramethyldisiloxane (16). Butyl isocyanate (4 g, 40 mmoles) is added to 5.0 g (20 mmoles) of compound (1).

Yield: 8.6 g (96.0%), $n_D^{20}$: 1.4475.

$^{11}$H-NMR (CCl$_4$, 100 MHz): $\beta = 0.06$ (s; Si—CH$_3$, 12H), 0.50 (t; Si—CH$_2$—, 4H), 0.93 (t; C$\underline{H}_3$—CH$_2$—, 6H), 1.50 (m; aliph. H, 12H), 3.10 (m; C$\underline{H}_2$—NH—, 4H), 4.07 (t; —CH$_2$—C$\underline{H}_2$—O —, 4H), 5.0 (m(b); >N—H, 2H).

C$_{20}$H$_{44}$N$_2$O$_5$Si$_2$ (448.7) calculated: C 53.53, N 6.24, H 9.88, found: C 52.88, N 6.40, H 10.14.

EXAMPLE 11

1,3-Bis(N-hexylcarbamoyloxypropyl)tetramethyldisiloxane (17). Hexyl isocyanate (5.1 g, 40 mmoles) is added to 5.0 g (20 mmoles) of compound (1).

Yield: 9.8 g (96.0%), $n_D^{20}$: 1.4450

$^1$H-NMR (CCl$_4$, 100 MHz): $\delta = 0.06$ (s; Si—CH$_3$, 12H), 0.50 (t; Si—CH$_2$—, 4H), 0.86 (t; C$\underline{H}_3$—CH$_2$—, 6H), 1.24 (m; aliph. H, 16H), 1.54 (m; —CH$_2$—C$\underline{H}_2$—CH$_2$—, 4H), 2.95 (m; —CH$_2$—NH—, 4H), 3.90 (t; —CH$_2$—C$\underline{H}_2$—O—, 4H), 6.94 (m(b); >N—H, 2H)

C$_{24}$H$_{52}$N$_2$O$_5$Si$_2$ (504.9) calculated: C 57.09, N 5.56, H 10.38, found: C 56.47, N 5.28, H 10.38.

EXAMPLE 12

Poly(oxytrimethylenetetramethyldisiloxane-1,3-diyltrimethyleneoxycarbonyliminotetramethyleneiminocarbonyl) (18). Tetramethylene diisocyanate (2.8 g, 20 mmoles) is added to 5.0 g (20 mmoles) of compound (1).

Yield: 7.6 g (97.0%).

$^1$H-NMR (CCl$_4$, 100 MHz): $\delta = 0.14$ (s; Si—CH$_3$, 12H), 0.56 (t; Si—CH—, 4H), 1.64 (m; aliph. H; 8H), 3.24 (m; —CH$_2$—NH—, 4H), 4.00 (t; —CH$_2$—C$\underline{H}_2$—O—, 4H), 4.92 (m(b); >N—H, 2H).

(C$_{16}$H$_{34}$N$_2$O$_5$Si$_2$)$_n$ (390.6)$_n$ calculated: C 49.2, N 7.2, H 8.7, found: C 48.6, N 7.3, H 9.0.

EXAMPLE 13

Poly(oxytrimethylenetetramethyldisiloxane-1,3-diyltrimethyleneoxycarbonyliminohexamethyleneiminocarbonyl) (19). Hexamethylene diisocyanate (3.4 g, 20 mmoles) is added to 5.0 g (20 mmoles) of compound (1).

Yield: 8.0 g (95.0%).

$^1$H-NMR (CCl$_4$, 100 MHz): $\delta = 0.14$ (s; Si—CH$_3$, 12H), 0.45 (t; Si—CH$_2$—, 4H), 1.40 (m; aliph. H, 12 H), 3.24 (m; —CH$_2$—NH—, 4H), 4.00 (t; —CH$_2$—C$\underline{H}_2$—O—, 4H), 4.92 (m(b); >N—H, 2H).

(C$_{18}$H$_{38}$N$_2$O$_5$Si$_2$)$_n$ (418.7)$_n$ calculated: C 51.7, N 6.7, H 9.1, found: C 51.0, N 6.8, H 9.1.

The compounds (13) to (17) and polymers (18) and (19) are liquid or highly viscous products.

Starting with diol (14), the following reactions are carried out.

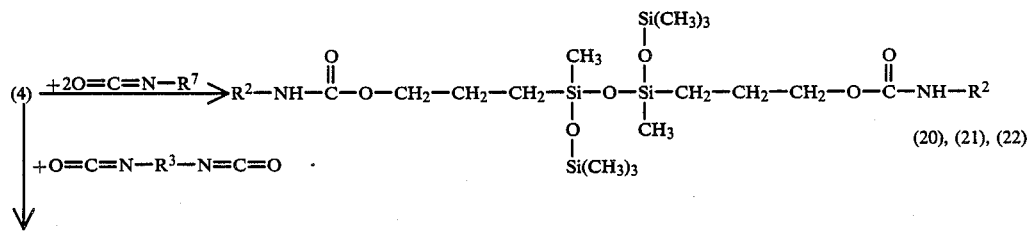

-continued

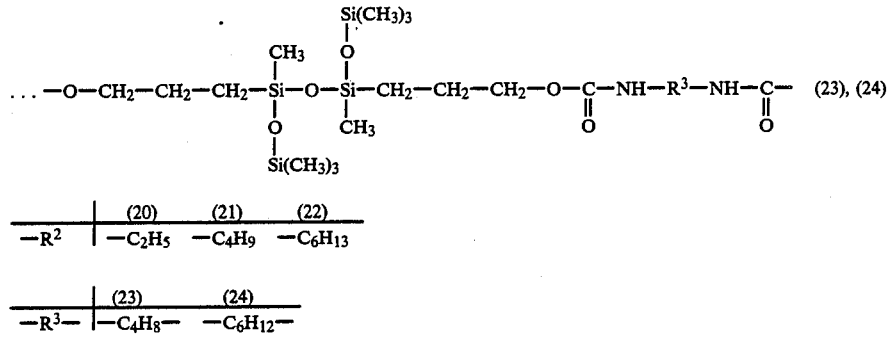

| $-R^2$ | (20) | (21) | (22) |
|---|---|---|---|
|  | $-C_2H_5$ | $-C_4H_9$ | $-C_6H_{13}$ |

| $-R^3-$ | (23) | (24) |
|---|---|---|
|  | $-C_4H_8-$ | $-C_6H_{12}-$ |

Examples of the above reactions are given in the following.

EXAMPLE 14

3,5-Bis(N-ethylcarbamoyloxypropyl)octamethyltetrasiloxane (20). Ethyl isocyanate (2.8 g, 40 mmoles) is added to 8.0 g (20 mmoles) of compound (4).

Yield: 10.6 g (98.0%).

$^1$H-NMR ($[^2H_6]$-DMSO, 100 MHz): δ0.08 (s; Si—CH$_3$ 24H), 0.46 (m; Si—CH$_2$—, 4H), 1.00 (m; CH$_3$—CH$_2$—, 6H), 1.56 (m; —CH$_2$—CH$_2$—CH$_2$—, 4H), 3.00 (q; —CH$_2$—C$_3$, 4H), 3.88 (t; —CH$_2$—CH$_2$—O—, 4H), 6.90 (m(b); >N—H, 2H)

C$_{20}$H$_{48}$N$_2$O$_7$Si$_4$ (540.9) calculated: C 44.41, N 5.18, H 8.94, found: C 44.59, N 5.26, H 9.16.

EXAMPLE 15

3,5-Bis(N-butylcarbamoyloxypropyl)octamethyltetrasiloxane (21). Butyl isocyanate (4.0 g, 40 mmoles) is added to 8.0 g (20 mmoles) of compound (4).

Yield: 11.6 g (97.0%).

$^1$H-NMR ($[^2H_6]$—DMSO, 100 MHz): δ=0.08 (s; Si—CH$_3$, 24H), 0.48 (m; Si—CH$_2$, 4H), 0.87 (m; CH$_3$—CH$_2$, 6H), 1.33 (m; NH—CH$_2$—CH$_2$—CH$_2$—8H), 1.55 (m; CH$_2$—CH$_2$—CH$_2$—O, 4H), 2.98 (m; CH$_2$—NH, 4H), 3.88 (t; CH$_2$—CH$_2$—O, 4H), 6,90 (m(b); N—H, 2H).

C$_{24}$H$_{56}$N$_2$O$_7$Si$_4$ (597.0) calculated: C 48.28, N 4.69, H 9.45, found: C 48.11, N 5.01, H 9.23.

EXAMPLE 16

3,5-Bis(N-hexylcarbamoyloxypropyl)octamethyltetrasiloxane (22). Hexyl isocyanate (51 g, 40 mmoles) is added to 8.0 g (20 mmoles) of compound (4).

Yield: 12.8 g (98.0%).

$^1$H-NMR ($[^2H_6]$—DMSO, 100 MHz): δ=0.07 (s; Si—CH$_3$, 24H), 0.50 (m; Si—CH$_2$—, 4H), 0.86 (m; CH$_3$—CH$_2$—, 6H), 1.26 (m; aliph. H, 16H), 1.5 (m; —CH$_2$—CH$_2$—CH$_2$—O—, 4H), 2.95 (m; —CH$_2$—NH—, 4H), 3.88 (t, —CH$_2$—CH$_2$—O—, 4H), 6.92 (b>N—H, 2H).

C$_{28}$H$_{64}$N$_2$O$_7$Si$_4$ (653.2) calculated: C 51.49, N 4.29, H 9.88, found: C 49.20, N 4.10, H 9.63.

EXAMPLE 17

Poly(oxytrimethyleneoctamethyltetrasiloxane-3,5-diyltrimethyleneoxycarbonyliminotetramethyleneiminocarbonyl) (23). Tetramethylene diisocyanate (1.4 g, 10 mmoles) is added to 4.0 g (10 mmoles) of compound (4), which is dissolved in 50 mL of dioxane and heated to 100° C. After 2 hours of stirring, a white precipitate is formed, which is washed with petroleum ether/benzene (1:1). The compound obtained (23) does not melt at temperatures up to 300° C.

Yield: 4.5 g (83.0 g)

(C$_{20}$H$_{46}$N$_2$O$_7$Si$_4$)$_n$ (538.9)$_n$ calculated: C 44.6, N 5.2, H 8.5, found: C 44.3, N 5.4, H 8.3.

EXAMPLE 18

Poly(oxytrimethyleneoctamethyltetrasiloxane-3,5-diyltrimethyleneoxycarbonyliminohexamethyleneiminocarbonyl) (24). Hexamethylene diisocyanate (1.7 g, 10 mmoles) is added to 4.0 g of compound (4) and the procedure of Example 17 is followed. The compound (24) obtained does not melt at temperatures up to 300° C.

Yield: 4.8 g (84.0%).

(C$_{22}$H$_{50}$N$_2$O$_7$Si$_4$)$_n$ (567.0)$_n$ calculated: C 46.6, N 5.0, H 8.8, found: C 46.3, N 5.1, H 8.4.

Illustrative compounds (20) to (22) are liquids and polymers (23) and (24) are solids.

The synthesized compounds (15) to (17) and (20) to (22), given above, as well the above polymers (18), (19), (23) and (24) are characterized by spectroscopic procedures. The combination of IR spectra (L. J. Bellamy, *The Infra-red Spectra of Complex Molecules*, Halstead Press, Third Edition, New York (1975), page 374), $^1$H-NMR and mass spectra provide unambiguous information concerning the structure of the synthesized compounds and polymers. The IR spectra of the compounds and polymers are recorded using KBr pellets or films. All model compounds (15) to (17) as well as (20) to (22) and polymers (18), (19), (23) and (24) contains bands at 2960 and 2880 cm$^{-1}$ (CH$_2$) and 1410 cm$^{-1}$ (Si—CH$_2$—). The siloxane units in the compounds and polymers show IR absorption below 1400 cm$^{-1}$. The symmetric and asymmetric valence oscillation bands for Si—CH$_3$ are present at 800 cm$^{-1}$ and 840 cm$^{-1}$. All compounds and polymers show strong Si—O—Si absorption in the region from 1030–1080 cm$^{-1}$. At 1250 cm$^{-1}$, the characteristic absorption band of the Si—CH$_3$ oscillation (M. Sakiyama, *Bull. Chem. Soc. Japan* 31, 67 (1958) is visible. The compounds contain urethane units, which show the diamide bands I and II in the 1500–1700 cm$^{-1}$ region. The valence oscillation of the urethane units is at 3340 cm$^{-1}$. Selected IR absorption bands of the model compounds (15) to (17) and (20) to (22) are given in the following Table 5. In addition, the characteristic IR frequencies of the polymers (18), (19), (23) and (24) are listed in Table 5.

TABLE 5

| Substance | Amide Bands I | | Amide Bands II | | ν(Si—O—Si) | ν(Si(CH₃)₂) |
| | ν(N—H) | ν(C=O) | ν(C—N) / δ(C—N—H) | δ(Si—CH₃) | | |
|---|---|---|---|---|---|---|
| (15) | 3340 (m) | 1700 (s) | 1530 (m) | 1255 (s) | 1155 (s) | 800 ( ) |
| (16) | 3345 (m) | 1715 (s) | 1525 (m) | 1250 (s) | 1060 (s) | 795 ( ) |
| (17) | 3340 (m) | 1715 (s) | 1535 (m) | 1255 (s) | 1050 (s) | 795 ( ) |
| (18) | 3340 (m) | 1700 (s) | 1525 (m) | 1250 (s) | 1040–1080 (s) | 800 ( ) |
| (19) | 3360 (m) | 1700 (s) | 1540 (m) | 1260 (s) | 1050–1070 (s) | 795 ( ) |
| (20) | 3340 (m) | 1700 (s) | 1535 (m) | 1255 (s) | 1040–1080 (s) | 795 ( ) |
| (21) | 3335 (m) | 1700 (s) | 1535 (m) | 1260 (s) | 1040–1070 (s) | 795 ( ) |
| (22) | 3335 (m) | 1700 (s) | 1535 (m) | 1260 (s) | 1040–1070 (s) | 795 ( ) |
| (23) | 3360 (m) | 1695 (s) | 1530 (m) | 1250 (s) | 1040–1070 (s) | 795 ( ) |
| (24) | 3410 (m) | 1695 (s) | 1535 (m) | 1260 (s) | 1040–1070 (s) | 795 ( ) |

(m: medium, s: strong)

In the ¹H-NMR spectra of the low molecular weight compounds, the methylene protons, which are adjacent to the C=O groups, are shifted by about 1 ppm. In a lower field, the methyl protons in the α-position lie in the vicinity of the NH group. The methyl groups which are linked to Si atoms show resonance signals between 0.0 and 0.1 ppm.

The ¹H—NMR spectra of the soluble polymers (18) and (19) are similar to the spectra of the corresponding model compounds (16) and (17). The mass spectra show fragments which are analogous to molecular units of the synthesized model compounds.

The molecular weights of the polymers (18) and (19) were obtained by vapor phase osmometry and are of the order of 6,000 for compound (18) and 8,000 for compound (19). This corresponds to an average degree of condensation of 15 and 20 respectively. Because of their insolubility, it was impossible to determine the molecular weight of polymers (23) and (24).

The low molecular weight compounds (1), (3), (4) and (5) are suitable for synthesizing corresponding compounds with longer siloxane chains by equilibration with cyclic and/or linear dimethylsiloxanes. The dimethylsiloxanes (1) and (3) with hydrophilic hydroxyalkyl groups can be used for equilibrating silicone rubber films to produce hydrophilic surfaces on the hydrophobic silicone rubber materials.

The copolymers (18), (19), (23) and (24) with the siloxane and urethane units can be used as pure substances or in mixtures with polydimethylsiloxanes as starting materials for a free radical cross linking reaction at temperatures of 100°–160° C. (high-temperature vulcanization) to form clear, colorless films, as explained in the Examples above.

In addition to the uses hereinbefore described, the modified silicone rubber of this invention can also be used to impart scratch resistance to a material by coating it on to said material.

We claim:

1. Silicone rubber having hydrophilic properties and having main chains of the partial formula

—OCONH—R¹—NHCO—OCH₂C(CH₃)₂CHOH-CONH(CH₂)₃—O—CONH—R¹—NH-CO—O—R²— in which R¹ is —(CH₂)$_w$—,

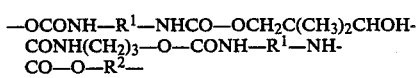

w being an integer from 2 to 16, and R² is

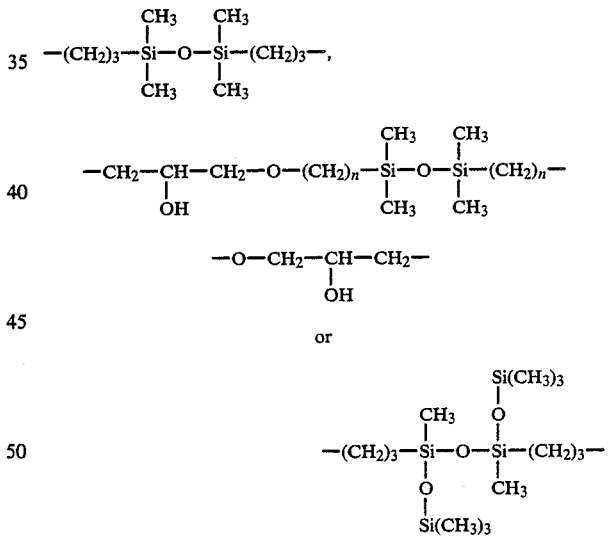

where n is 3, 4 or 5, and with said main chains being crosslinked through methyl groups.

2. An optical lens wherein the whole of the lens body comprises a modified silicone rubber according to claim 1.

3. An optical lens according to claim 2 which is a contact lens.

4. An optical lens according to claim 2 which is an intraocular lens.

5. An optical lens wherein the surface of the lens body comprises a modified silicone rubber according to claim 1.

6. An optical lens according to claim 5 which is a contact lens.

7. An optical lens according to claim 5 which is an intraocular lens.

8. A process for the synthesis of a modified silicone rubber with hydrophilic properties which comprises
   (a) reacting a diisocyanate with pantothenol in a 2:1 molar ratio to form an adduct having terminal isocyanate groups,
   (b) then reacting the adduct product of step (a) with a dimethylsiloxane having hydroxyalkyl groups to obtain a polymer having dimethylsiloxane and urethane units, and
   (c) then causing said polymer to crosslink through said methyl groups.

9. A process according to claim 8 in which the dimethylsiloxane is 1,3-bis(3-hydroxypropyl)-1,1,3,3-tetramethyldisiloxane, 1-(3-hydroxypropyl)-1,1,3,3-tetramethyldisiloxane, 1,3-bis(6,7-dihydroxy-4-oxaheptyl)-1,1,3,3-tetramethyldisiloxane, 3,5-bis(3-hydroxypropyl)-1,1,1,3,5,7,7,7-octamethyltetrasiloxane, 1-(6,7-dihydroxy-4-oxaheptyl)-1,1,3,3-tetramethyldisiloxane, 2,4,6,8-tetrakis(3-hydroxypropyl)-2,4,6,8-tetramethylcyclotetrasiloxane, methylene-bis(1,4-cyclohexylene(carbamic acid)-3-[3-(3-hydroxypropyl)-1,1,3,3-tetramethyldisiloxanyl]-propyl ester, or hexamethylene-1,6-bis(carbamic acid)-3-[3-(3-hydroxypropyl)-1,1,3,3-tetramethyldisiloxanyl]-propyl ester.

10. A process according to claim 8 wherein rubber-forming initiators are used as crosslinking agents.

11. A process according to claim 10 in which the crosslinking agent is a peroxide.

12. A process according to claim 8 wherein the molar ratio of dimethylsiloxane to diisocyanate is 1:2.

* * * * *